United States Patent [19]

Staffieri

[11] 4,240,731
[45] Dec. 23, 1980

[54] STEREOSCOPIC CAMERA

[76] Inventor: Giovanni M. Staffieri, 6933 Muzzano, Switzerland

[21] Appl. No.: 10,230

[22] Filed: Feb. 8, 1979

Related U.S. Application Data

[63] Continuation-in-part of Ser. No. 808,696, Jun. 21, 1977, abandoned.

[30] Foreign Application Priority Data

Jun. 24, 1976 [CH] Switzerland .................. 8060/76

[51] Int. Cl.³ .................................................. G03B 35/00
[52] U.S. Cl. ........................................ 354/114; 352/60
[58] Field of Search .............. 354/113, 114, 115, 117, 354/112; 352/60, 65

[56] References Cited

U.S. PATENT DOCUMENTS

| | | | |
|---|---|---|---|
| 2,240,398 | 4/1941 | Huitt | 352/60 |
| 3,063,334 | 11/1962 | Smith | 354/115 X |
| 3,551,036 | 12/1970 | Bielusici | 352/60 |

FOREIGN PATENT DOCUMENTS

| | | | |
|---|---|---|---|
| 705928 | 4/1941 | Fed. Rep. of Germany | 354/115 |
| 634092 | 3/1950 | United Kingdom | 354/115 |
| 1044953 | 10/1966 | United Kingdom | 354/114 |

*Primary Examiner*—Michael L. Gellner
*Attorney, Agent, or Firm*—Young & Thompson

[57] ABSTRACT

A stereoscopic camera has two lens-and-mirror trains for imposing a pair of stereoscopic images in side-by-side relationship on a common photographic film. Each optical train comprises a pair of oblique mirrors and plural lens elements. However, the final or objective lens of one train is at a right angle to that of the other train, one objective lens having its axis parallel to the lines of sight and the other objective lens having its axis perpendicular thereto, this latter lens preceding its final oblique mirror and the former lens following the final oblique mirror, in their respective optical trains. In this way, the depth of the camera, parallel to the lines of sight, is substantially reduced and the sizes of the mirrors are substantially reduced. Stopping diaphragms are provided for each optical train, at right angle to each other, and mounted on a common block that is movable past the optical axes to permit the selection of the diaphragms of different sizes.

8 Claims, 2 Drawing Figures

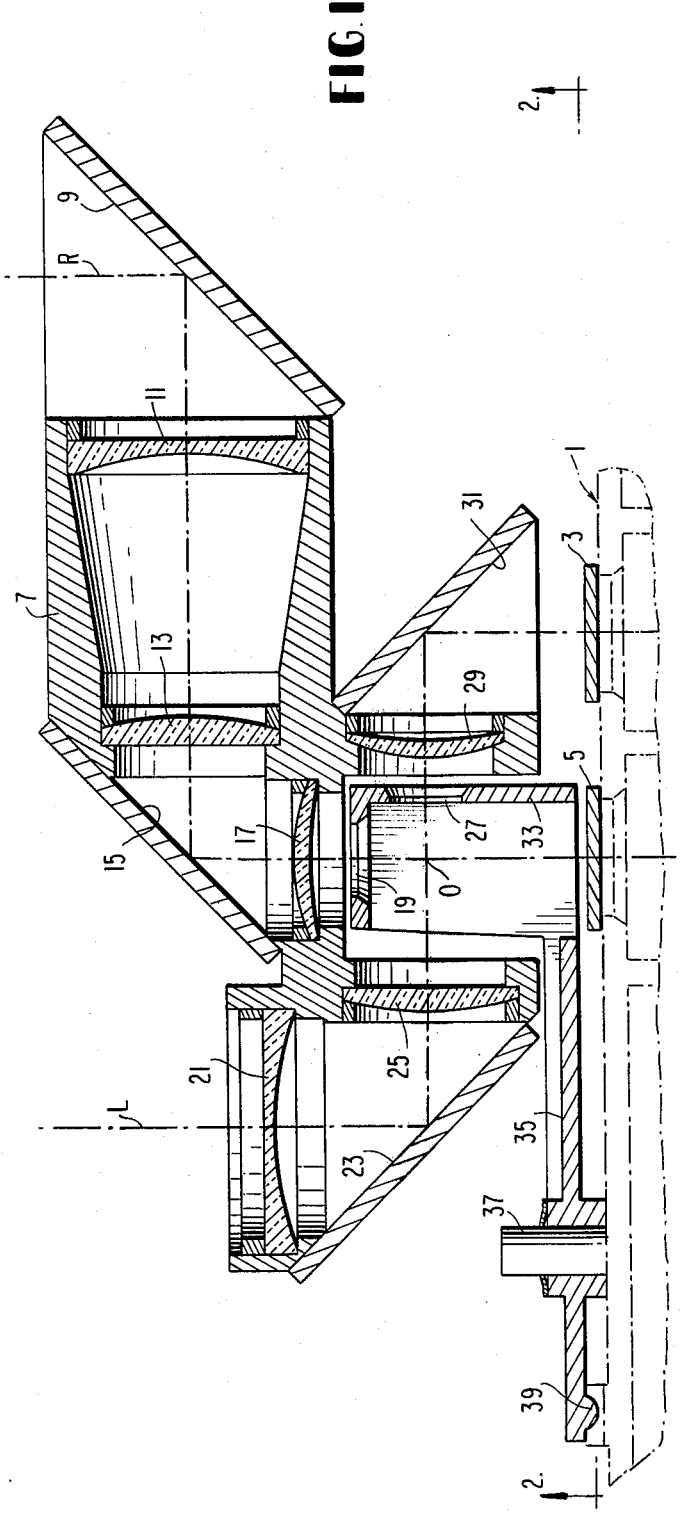

STEREOSCOPIC CAMERA

This application is a continuation-in-part of application Ser. No. 808,696, filed June 21, 1977, now abandoned.

The present invention relates to stereoscopic cameras, more particularly to such cameras adapted to sight along two parallel spaced lines of sight and to project the respective images in side-by-side relationship onto photographic film.

Such devices as heretofore known comprise two optical trains each comprising a plurality of mirrors and lenses for reproducing the images side-by-side on a common photographic film in a common focal plane. The mirrors are disposed in such a manner that the bundles of rays of the two images cross, and the right image exposes the film on the left side thereof while the left image exposes the film on the right side thereof. Then, when the film is developed and displayed, the original order of the images is restored because of the optical reversal of the lens systems.

It is an object of the present invention to improve the stereoscopic cameras heretofore known, by reducing their size as measured in a direction parallel to the lines of sight.

Another object of the present invention is to improve stereoscopic cameras as heretofore known, by reducing the size of the mirrors that must be used therewith, and hence the overall size of the cameras.

Still another object of the present invention is to improve stereoscopic cameras as heretofore known, by providing a unique and simple diaphragm construction for stopping down the images to avoid stray incident light.

Other objects, features and advantages of the present invention will become apparent from a consideration of the following description, taken in connection with the accompanying drawings, in which:

FIG. 1 is a cross-sectional view of a stereoscopic camera according to the present invention, with conventional camera chassis parts broken away and shown only diagrammatically, taken on the line 1—1 of FIG. 2; and FIG. 2 is a cross-sectional view taken on the line 2—2 of FIG. 1.

Referring now to the drawings in greater detail, there is shown a stereoscopic camera according to the present invention whose chassis 1 may be largely conventional and so is indicated only diagrammatically. Chassis 1 of course comprises a light-proof enclosure through which a photographic film (not shown) can be selectively moved framewise by conventional structure (not shown), in the common focal plane of the stereoscopic lens systems to be described hereinafter. The film, incidentally, can be conventional 35 mm. film, the lens systems to be described each exposing half of each frame of the film, of areas approximately 24×18 mm., so that each 24×36 mm. frame of conventional 35 mm. film receives two images that differ from each other only by the stereoscopic effect, and which are as usual optically reversed and also reversed relative to each other, as explained above.

As is also known in stereoscopic cameras, chassis 1 is closed by two shutters 3 and 5 adapted to be simultaneously actuated by conventional means (not shown), one shutter of course being individual to each of the two laterally spaced optical axes of the stereoscopic system.

The two optical axes are designated R and L, corresponding to the right and left images as would be viewed by human eyes. The lateral spacing of these two axes can initially be, for example, 72 mm., or a conventional interocular distance.

Turning now to each optical train, that of axis R will first be considered. The incident rays first impinge on a diagonal mirror 9 and are reflected at right angles through a first lens 11 and a second lens 13 to oppositely inclined diagonal mirror 15, and thence through final lens 17 which serves as the objective lens of the Galilean lens train previously described. The focused rays then pass through a diaphragm 19 and impinge or not on shutter 5, depending on whether the shutter is open or closed. Notice that objective lens 17 follows mirror 15 in the optical train and precedes diaphragm 19.

The other optical train, whose axis is L, receives incident light first through lens 21 and thence to diagonal mirror 23, from which light is reflected through lens 25, through diaphragm 27, thence through final lens 29 which serves as before as an objective lens of a Galilean lens system, and finally to second diagonal mirror 31, whence the rays are reflected to or past shutter 3. In the vicinity of the shutters, the interaxial spacing of the bundles of rays can be for example 19 mm. Notice that lens 21 precedes mirror 23, and that lens 29 precedes mirror 31 but follows diaphragm 27.

The particular sequence of mirrors, lenses and diaphrams, and the arrangement of lenses 17 and 29 at right angles to each other, and the arrangement of diaphragms 19 and 27 at right angles to each other, results in a great foreshortening, parallel to the lines of sight of the camera, of the physical size of the camera. It also results in the ability to use substantially smaller mirrors, than if the lens and mirror and diaphragm systems were disposed in a different arrangement. Thus not only the depth of the camera, but also its overall size, is greatly reduced by the arrangement of the present invention.

Of course, the mirrors 9, 15, 23 and 31 are front-silvered or aluminized.

The diaphragms 19 and 27 are disposed at right angles to each other in a common block 33 whose shape is best seen by comparison of FIGS. 1 and 2. Notice that block 33 is in effect hollow, the wall in which the diaphragms 19 are disposed being flat and that in which the diaphragms 27 are disposed being arcuate. Block 33 is carried by an arm or web 35 for rotation about an axle 37 fixed to camera chassis 1, the axis of rotation being coaxial with the arcuate wall in which the diaphgrams 27 are disposed. The axes of diaphragms 19 are likewise disposed at a common distance from that axis of rotation. An actuator arm 39 extends from the hub by which web 35 is mounted for rotation on axle 37, and serves for the selective positioning of diaphragms 19 and 27 pairwise in their respective optical trains. It is of course preferred that both optical trains be identical. Therefore, each pair 19, 27 of diaphragms will have a common relationship to each other; but the various diaphragms 19 will of course differ from each other in diameter, as will the various diaphragms 27, so as to vary exposure in a known way.

Notice also that the two optical axes R and L intersect at O, which is disposed within block 33 closely adjacent the associated pair of diaphragms 19, 27.

From a consideration of the foregoing disclosure, therefore, it will be evident that all the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand.

Such modifications and variations are considered to be within the purview and scope of the present invention as defined by the appended claims.

What is claimed is:

1. A stereoscopic camera for taking stereoscopic photographs in pairs in side-by-side zones on photograhic film, comprising two lens systems and mirror means, each lens system comprising a plurality of lenses of which at least two are disposed at right angles to each other, said mirror means comprising, for one lens system, two oblique mirrors with at least one lens therebetween and an objective lens that follows the last of said two mirrors and whose axis is parallel to the line of sight of the camera, the mirror means for the other lens system comprising two oblique mirrors oppositely inclined to the first two mirrors and having an objective lens between them which is the last lens of the system and which is disposed at right angles to the first-mentioned objective lens.

2. A camera as claimed in claim 1, there being a lens preceding the first of the two mirrors for said other system and whose optical axis is parallel to the line of sight of the camera.

3. A camera as claimed in claim 2, the first lens of said one system following the first mirror for said one system on which light impinges.

4. A stereoscopic camera for taking stereoscopic photographs in pairs in side-by-side zones on photographic film, comprising two lens systems and mirror means, each lens system comprising a plurality of lenses of which at least two are disposed at right angles to each other and a pair of diaphragms whose axes are disposed at right angles to each other, one said diaphragm being coaxial with each of said objective lenses.

5. A camera as claimed in claim 4, there being a plurality of pairs of said diaphragms mounted on a common support, and means mounting said common support for movement relative to said systems to position selected pairs of said diaphragms simultaneously in the optical trains of said two systems.

6. A camera as claimed in claim 5, said support being a block mounted on the camera for rotation about an axis, said block having two walls one of which is perpendicular to said last-named axis and flat, the other of which is arcuate and coaxial with said last-named axis, a plurality of said diaphragms opening through said flat wall whose axes are all equidistant from the axis of rotation of the block, and a plurality of diaphragms opening through said arcuate wall whose axes are all disposed in a common plane perpendicular to the axis of rotation of the block, each diaphragm in said flat wall comprising a pair with a diaphragm in said arcuate wall, the diaphragms of each pair having their axes disposed in a plane common to the axis of rotation of the block.

7. A camera as claimed in claim 6, the diaphragms in said flat wall differing from each other in size, the diaphragms in said arcuate wall differing from each other in size.

8. A camera as claimed in claim 4, the optical axes of each said system intersecting at a point, each said diaphragm being disposed between said point and its associated said objective lens.

* * * * *